(12) United States Patent
Lee et al.

(10) Patent No.: US 12,332,601 B2
(45) Date of Patent: Jun. 17, 2025

(54) HOLOGRAPHIC DISPLAY APPARATUS AND HOLOGRAM OPTIMIZATION METHOD THEREFOR

(71) Applicant: SEOUL NATIONAL UNIVERSITY R&DB FOUNDATION, Seoul (KR)

(72) Inventors: Byoungho Lee, Seoul (KR); Dukho Lee, Seoul (KR); Kiseung Bang, Seoul (KR); Seung-Woo Nam, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/904,744

(22) PCT Filed: Dec. 30, 2021

(86) PCT No.: PCT/KR2021/020255
§ 371 (c)(1),
(2) Date: Aug. 22, 2022

(87) PCT Pub. No.: WO2023/128010
PCT Pub. Date: Jul. 6, 2023

(65) Prior Publication Data
US 2024/0192638 A1    Jun. 13, 2024

(30) Foreign Application Priority Data

Dec. 27, 2021    (KR) .................. 10-2021-0188990

(51) Int. Cl.
*G03H 1/22*    (2006.01)
*G03H 1/04*    (2006.01)
(Continued)

(52) U.S. Cl.
CPC ......... *G03H 1/2202* (2013.01); *G03H 1/0443* (2013.01); *G03H 1/0486* (2013.01);
(Continued)

(58) Field of Classification Search
CPC .... G02B 27/30; G03H 1/2202; G03H 1/0443; G03H 1/0486; G03H 1/0808; G03H 1/12;
(Continued)

(56) References Cited

U.S. PATENT DOCUMENTS 8,879,154 B2    11/2014  Choi et al.
10,416,762 B2    9/2019  Kim et al.
(Continued)

FOREIGN PATENT DOCUMENTS

JP    H02-257183 A    10/1990
JP    H03144814 A  *  6/1991
(Continued)

OTHER PUBLICATIONS

Office Action for Korean Patent Application No. 10-2021-188990 mailed Sep. 20, 2023, 8 pages.
(Continued)

*Primary Examiner* — Arnel C Lavarias
(74) *Attorney, Agent, or Firm* — Kilpatrick Townsend & Stockton LLP

(57) ABSTRACT

A holographic display apparatus and a hologram optimization method for the apparatus are provided. The holographic display apparatus includes a focus-forming optical element configured to form a plurality of foci by receiving plane waves; a collimating lens configured to propagate, as plane waves, light incident through the plurality of foci; and a spatial light modulator configured to generate a holographic image by overlapping a plurality of plane waves incident from the collimating lens.

6 Claims, 5 Drawing Sheets

(51) Int. Cl.
*G03H 1/08* (2006.01)
*G03H 1/12* (2006.01)

(52) U.S. Cl.
CPC ............ *G03H 1/0808* (2013.01); *G03H 1/12* (2013.01); *G03H 2001/045* (2013.01); *G03H 2001/0833* (2013.01); *G03H 2001/2239* (2013.01)

(58) Field of Classification Search
CPC ..... G03H 2001/045; G03H 2001/0833; G03H 2001/2239; G03H 1/00; G03H 2001/0088; G03H 2001/0452; G03H 2001/0491; G03H 1/08; G03H 2001/0816; G03H 1/0866; G03H 2001/1883; G03H 1/0891; G03H 1/16; G03H 2001/2236; G03H 1/03
USPC .......... 359/1, 9, 22, 25, 29, 32, 33, 35, 641; 430/1, 2
See application file for complete search history.

(56) References Cited

U.S. PATENT DOCUMENTS

| | | |
|---|---|---|
| 2008/0192343 A1* | 8/2008 | Miyawaki ............. G02B 30/40 359/462 |
| 2020/0264441 A1 | 8/2020 | Lee et al. |
| 2021/0279951 A1 | 9/2021 | Yoon et al. |

FOREIGN PATENT DOCUMENTS

| | | | |
|---|---|---|---|
| JP | H03148623 A | * | 6/1991 |
| JP | 2011128634 A | * | 6/2011 |
| JP | 2012009872 A | * | 1/2012 |
| KR | 2010-0017786 A | | 2/2010 |
| KR | 2012-0042158 A | | 5/2012 |
| KR | 2012-0085543 A | | 8/2012 |
| KR | 2018-0009568 A | | 1/2018 |
| KR | 20200101044 A | | 8/2020 |
| KR | 10-2235646 B1 | | 4/2021 |
| KR | 2021-0113053 A | | 9/2021 |
| WO | 2008/138986 A2 | | 11/2008 |

OTHER PUBLICATIONS

International Search Report for PCT/KR2021/020255 mailed Sep. 15, 2022, all pages.

* cited by examiner

HOLOGRAPHIC DISPLAY APPARATUS AND HOLOGRAM OPTIMIZATION METHOD THEREFOR

TECHNICAL FIELD

Embodiments of the present disclosure relate to a holographic display apparatus and a hologram optimization method for the apparatus.

BACKGROUND ART

A holographic display modulates a wavefront of incident light by using laser, which is a coherent light source, and a spatial light modulator (SLM). Due to the complex wavefront modulation capability of the spatial light modulator, the holographic display may reproduce the same light wave as that of a real object and thus realize a three-dimensional image. For this reason, the holographic display is gaining attention next-generation display technology. The most representative application example of the holographic display is a holographic near-eye display. For a near-eye display, a wide viewing angle and a wide eye box are important, and in a holographic display, the two have a trade-off relationship. As the product of the viewing angle and the eye box in a holographic display is proportional to the number of pixels of a spatial light modulator, it is optically impossible to simultaneously increase the viewing angle and the eye box for a given spatial light modulator. This is called a space-bandwidth product of a spatial light modulator, and for this reason, more than 1 billion pixels are required to make a near-eye display having a viewing angle of 90 degrees or more and an eye box of 10 mm*10 mm or more.

It is almost impossible to manufacture such a spatial light modulator with current technology, and thus, attempts have been made to increase the viewing angle and the eye box of a holographic display through a similar effect thereto, even if the space-bandwidth product is actually not increased. One example of the attempts is using time division of a multi-light source, and in this display system, one spatial light modulator and multiple light sources are used. By synchronizing the spatial light modulator operating at a high speed and the light sources with each other, and displaying a hologram that is suitable for a light source reproducing plane waves in different directions, on a display so as to temporally overlap the plane waves with each other, an effect similar to that as if the space-bandwidth product of the display is increased may be obtained. However, the above method has disadvantages in that a very fast scanning rate of the spatial light modulator is required, and several light sources and accurate synchronization thereof are required.

DESCRIPTION OF EMBODIMENTS

Technical Problem

Embodiments of the present disclosure provide a holographic display apparatus having a wide viewing angle and a wide eye box at the same time, by increasing a space-bandwidth product, and a method therefor.

Embodiments of the present disclosure also provide a method of optimizing a hologram of a holographic display apparatus in which the viewing angle and the eye box are increased.

Solution to Problem

An example of a holographic display apparatus according to an embodiment of the present disclosure includes: a focus-forming optical element configured to form a plurality of foci by receiving plane waves; a collimating lens configured to propagate, as plane waves, light incident through the plurality of foci; and a spatial light modulator configured to generate a holographic image by overlapping a plurality of plane waves incident from the collimating lens.

An example of an optimization method of a holographic display, according to an embodiment of the present disclosure, includes: forming a plurality of foci with respect to plane waves by using a focus-forming optical element; propagating, as plane waves, light incident through a collimating lens through the plurality of foci; and by a spatial light modulator, generating a holographic image by overlapping a plurality of plane waves incident from the collimating lens.

Advantageous Effects of Disclosure

According to an embodiment of the present disclosure, a valid space-bandwidth product may be increased by implementing, by using a lens array, a light source incident onto a display from various directions. According to another embodiment, the problem of overlapping between high-order images of holograms may be addressed through gradient descent-based hologram optimization. For example, by applying the gradient descent-based hologram optimization according to the present embodiment to an eye box where the eyes of a user are located, normal image reproduction is possible without overlapping of high-order terms within a designated eye box.

MODE OF DISCLOSURE

Hereinafter, a holographic display apparatus according to an embodiment of the present disclosure and a hologram optimization method for the apparatus are described in detail with reference to the attached drawings.

Figure 1:
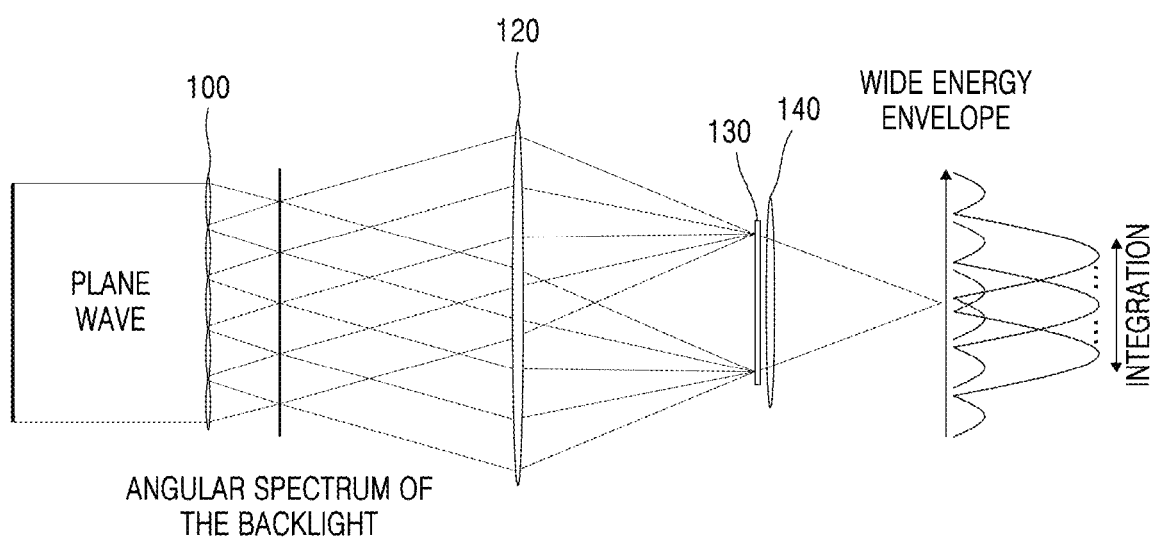
FIG. 1 illustrates an example of a holographic display apparatus according to an embodiment of the present disclosure.

FIG. 1 illustrates an example of a holographic display apparatus according to an embodiment of the present disclosure.

Referring to FIG. 1, the holographic display apparatus includes a focus-forming optical element 100, a collimating lens 120, and a spatial light modulator 130. In the present embodiment, for convenience of description, some elements of the holographic display apparatus are illustrated. Therefore, by adding other various elements to the configuration of FIG. 1, holographic display apparatuses of various forms may be implemented.

The focus-forming optical element 100 is an optical element for forming a plurality of foci by receiving plane waves of a hologram. Various optical elements for forming a plurality of foci may be applied to the present embodiment. For example, the focus-forming optical element 100 may be implemented using any one of a lens array, holographic optical elements, diffractive optical elements, and a pinhole array.

The collimating lens 120 is located at a location spaced apart from the foci formed by the focus-forming optical element 100 by a certain distance. From the perspective of the collimating lens 120, each focus operates as a point light source. The collimating lens 120 propagates light that is incident through a plurality of foci existing at different positions, as plane waves. The collimating lens 120 is an element that outputs collimated light, and may be implemented using a Fourier lens or the like.

The spatial light modulator 130 and the lens 140 overlap a plurality of plane waves that pass through the collimating lens 120 and are incident at different angles, thereby generating a holographic image. In the present embodiment, rather than time-dividing a light source, several plane waves are incident on one spatial light modulator 130, and thus, reproduced holographic images move in parallel to each other to overlap each other as illustrated in a graph on the right of FIG. 1.

In a typical holographic display, the original image cannot be restored from overlapped images. However, according to the present embodiment, since each image is formed from each light source (that is, each focus) and the images interfere with each other, a hologram which enables overlapping holographic images to be a desired image may be calculated through hologram optimization which is to be described below.

Figure 2:
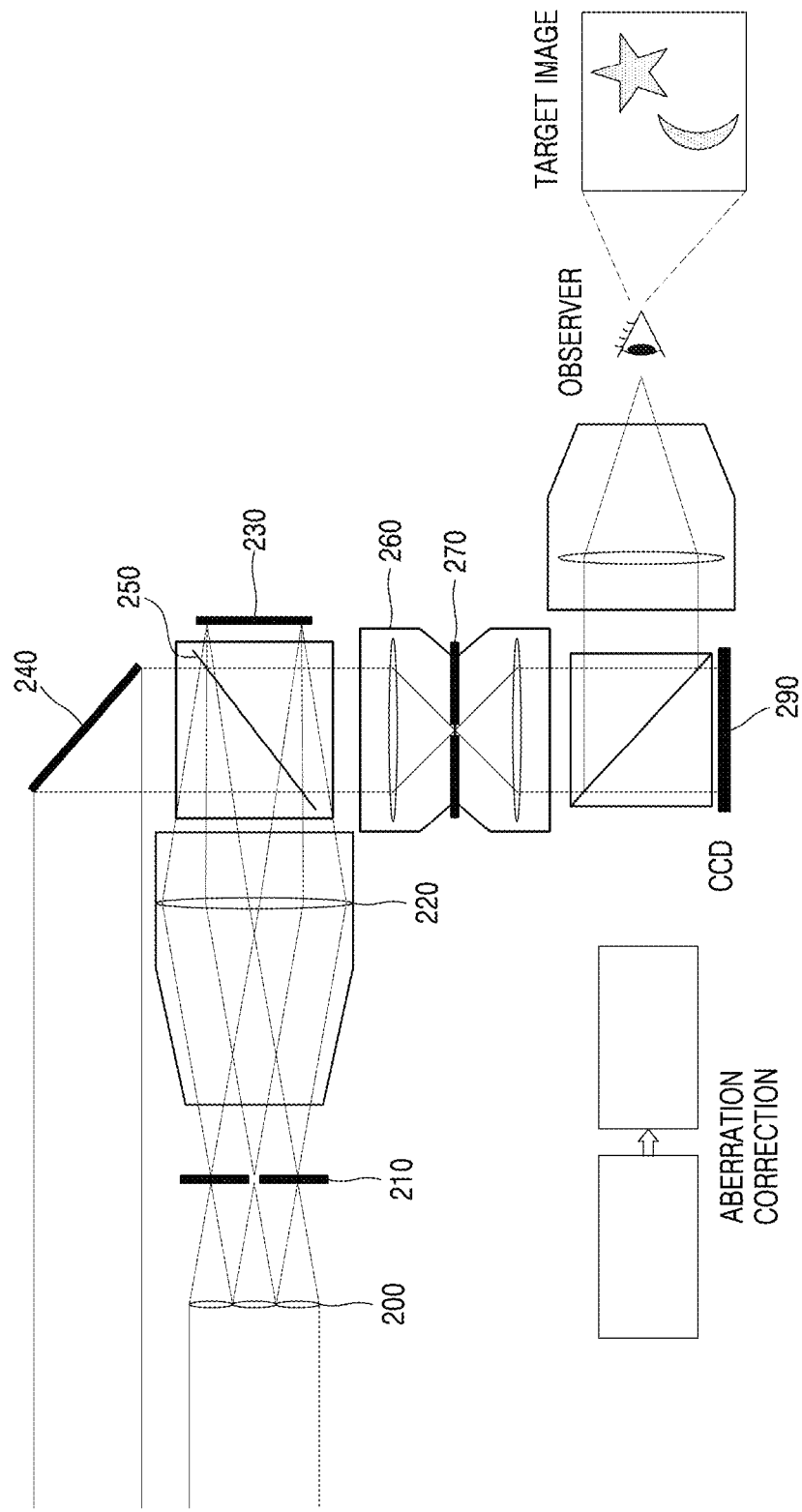
FIG. 2 illustrates an example of a holographic display apparatus for hologram optimization, according to an embodiment of the present disclosure.

FIG. 2 illustrates an example of a holographic display apparatus for hologram optimization, according to an embodiment of the present disclosure.

Referring to FIG. 2, the holographic display apparatus includes a focus-forming optical element 200, a collimating lens 220, a spatial light modulator 230, an imaging device 290, an aberration corrector (not shown) and an optimizer (not shown), and the like. Here, the focus-forming optical element 200, the collimating lens 220, the spatial light modulator 230, and the like have the same configuration as that described with reference to FIG. 1, and thus, a description thereof will be omitted. The aberration corrector and the optimizer may be implemented by a computing device including a memory and a processor.

The imaging device 290 captures an image in which a holographic image output from the spatial light modulator 230 and a reference wave overlap each other (that is, interfered with each other). A hologram is generated by recording interference fringes of a reference wave and an object wave. A plane wave (that is, a collimated wave) according to the present embodiment is a plane wave for a hologram, and the reference wave refers to a reference wave used to generate a hologram.

In the present embodiment, a mirror 240 and a polarization beam splitter (PBS) 250 are included to overlap a holographic image and a reference wave. However, the configuration of an optical system for overlapping a holographic image and a reference wave is not limited to the present embodiment and may be implemented in various forms.

The aberration corrector may measure aberration by using an image captured by the imaging device 290, and reflect a complex wavefront corresponding to the inverse of the measured aberration, in the spatial light modulator 230. A method of measuring aberration is already well known, and thus, an additional description thereof will be omitted.

In the present embodiment, holographic images are displayed in an overlapping manner by using a plurality of foci as a multi-light source. Accordingly, high-order term images of a hologram overlap, and further, when the wavelength of the light source is changed to realize a full-color image, the positions of the overlapping high-order images are changed, which makes it difficult to reproduce a normal image.

In order to solve this problem, the optimizer optimizes the hologram such that a normal image may be generated without overlapping of high-order terms in an eye box of a user. Masks 210 and 270 may be used to designate a certain eye box of a user.

When a certain eye box for the user is designated through the masks 210 and 270, the optimizer back-propagates holographic images displayed in a space of the eye box through the spatial light modulator 230, to a plane of the spatial light modulator 230, thereby generating a hologram (hereinafter, a predictive hologram). The optimizer calculates a holographic image for the predictive hologram (hereinafter, referred to as a predictive holographic image) by using a model simulating the optical system of the holographic display apparatus of the present embodiment. The optimizer repeats a process of generating the predictive hologram and the predictive holographic image such that a value of a loss function between the predictive holographic image and a predefined target image is minimized by using a gradient descent method. A detailed method of the optimizer is described again with reference to FIG. 3.

Figure 3:
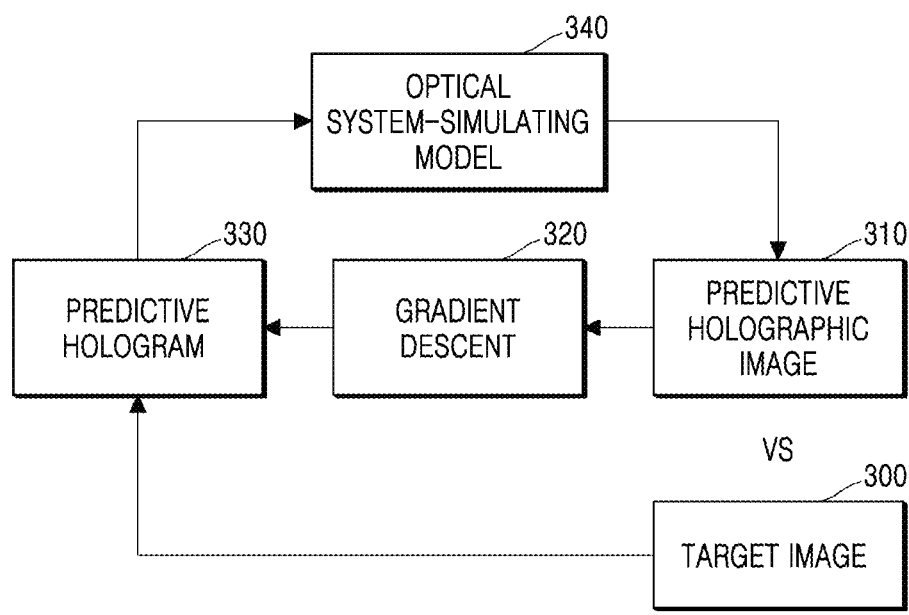
FIG. 3 illustrates an example of a hologram optimization method according to an embodiment of the present disclosure.

FIG. 3 illustrates an example of a hologram optimization method according to an embodiment of the present disclosure.

Referring to FIG. 3, the holographic display apparatus receives a hologram of a target image 300 and outputs a holographic image to the eye box of the user. It is assumed that a hologram of a target image is predefined by various methods according to the related art.

The optimizer of the holographic display apparatus calculates a predictive hologram 330 on a plane of a spatial light modulator by back-propagating the holographic image output to the eye box. The optimizer calculates a predictive holographic image 310 with respect to the predictive hologram 330 by using a model 340 simulating the optical system of the holographic display apparatus as illustrated in FIG. 2. It is assumed that the model 340 simulating the optical system is predefined by various methods according to the related art.

The optimizer identifies a difference between the predictive holographic image 310 and the target image 300 by using a loss function. For example, the optimizer may calculate a value of the loss function by comparing the predictive holographic image 310 with a holographic image (ground truth) of the target image 300. The holographic image of the target image 300 may be calculated using an angular spectrum method (ASM), which is a diffraction propagation model of light waves in free space. The value of the loss function, which is used to identify an image difference, may be calculated by a root mean square (RMS). Other various methods of calculating a difference between two images, according to the related art, may be used as a loss function according to the present embodiment, and the method of calculating an image difference is not limited to a certain method.

When the value of the loss function is not less than a predefined threshold, the optimizer reverse transcribes the predictive holographic image 310 to generate the predictive hologram 330, and here, a gradient descent method 320 is applied such that the predictive hologram 330 is generated in a direction in which the value of the loss function decreases.

The optimizer repeats the process of generating a new predictive holographic image again from a new predictive hologram generated by applying the gradient descent method 320 until the value of the loss function becomes less than a threshold.

When the value of the loss function is less than the threshold, the optimizer outputs a predictive hologram corresponding to the value of the loss function being less than the threshold as an optimized hologram for the target image 300. The holographic display apparatus outputs a holographic image by using the optimized hologram. In this case, the problem of overlapping of high-order terms existing in the eye box of the user may be resolved.

Figure 4:
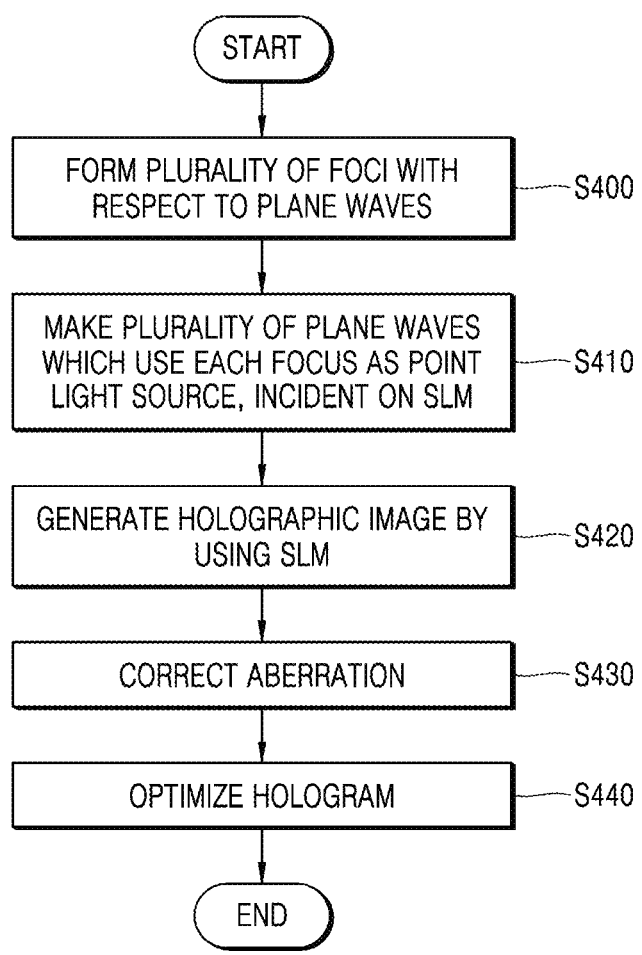
FIG. 4 is a flowchart of an example of an optimization method of a holographic display apparatus, according to an embodiment of the present disclosure.

FIG. 4 is a flowchart of an example of an optimization method of a holographic display apparatus, according to an embodiment of the present disclosure.

Referring to FIGS. 2 and 4 together, a plurality of foci are formed with respect to plane waves, by using the focus-forming optical element 200 implemented by a lens array or the like in operation S400. Light incident through the plurality of foci through the collimating lens 220 implemented using a Fourier lens, etc. is propagated as plane waves in operation S410. A holographic image is generated by overlapping a plurality of plane waves incident from the collimating lens 220, by using the spatial light modulator 230 in operation S420.

The aberration corrector measures aberration by using an image captured by making the reference wave interfere with the holographic image generated using the spatial light modulator 230, and reflects a complex wavefront corresponding to the inverse of the measured aberration, in the spatial light modulator to thereby correct the aberration in operation S430.

The optimizer optimizes a hologram by using the gradient descent method in operation S440. For example, the optimizer generates a predictive hologram obtained by back-propagating a holographic image, and generates a predictive holographic image for the predictive hologram through a model simulating an optical system of a holographic display. The optimizer repeats the process of generating a predictive hologram and a predictive holographic image until a loss function between the predictive holographic image and a predefined target image is less than a predefined threshold, by using the gradient descent method. An example of a detailed method of the optimizer is illustrated in FIG. 3.

Figure 5:
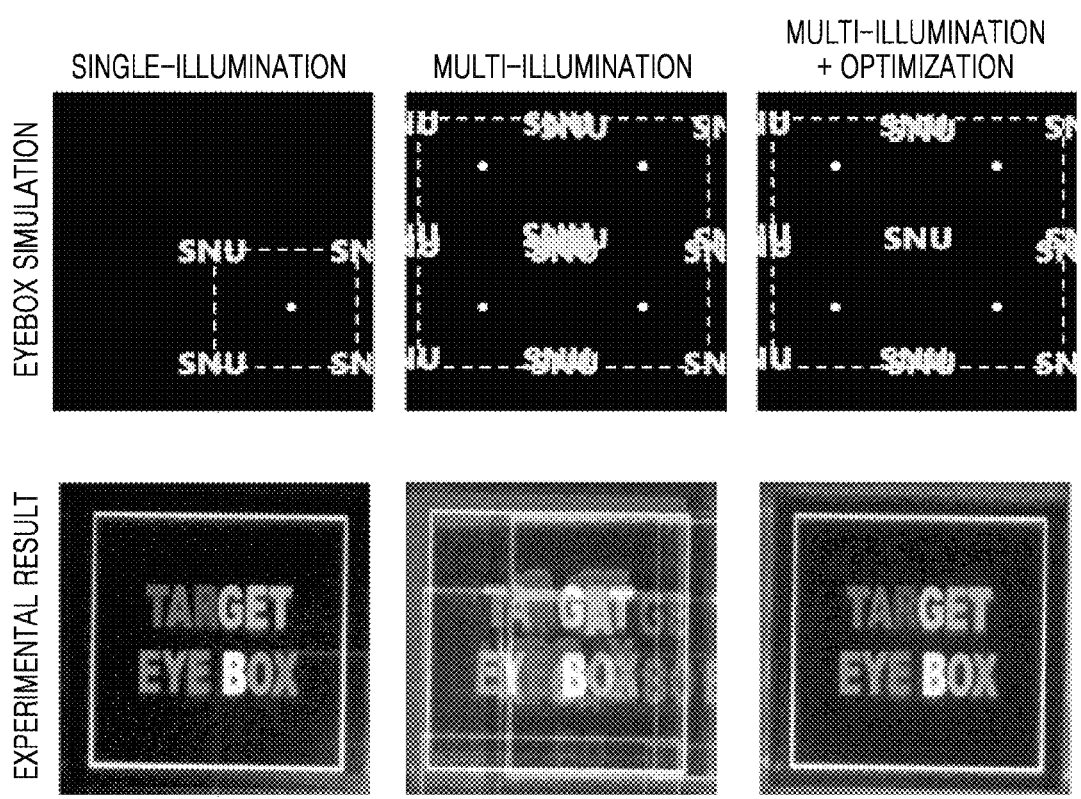
FIG. 5 illustrates experimental results according to an embodiment of the present disclosure.

FIG. 5 illustrates experimental results according to an embodiment of the present disclosure.

Referring to FIG. 5, when using a single light source, a clear holographic image is reproduced, but the eye box thereof is narrow. On the other hand, as in the embodiment of FIG. 1, when generating holographic images by forming a plurality of foci, the holographic images are arranged overlapping each other, and thus, a wide viewing angle and a wide eye box may be ensured. When performing aberration correction and hologram optimization according to the embodiment of FIG. 2, a clear holographic image may be reproduced by removing overlapping between high-order terms.

While the present disclosure has been particularly shown and described with reference to embodiments thereof, it will be understood by those of ordinary skill in the art that various changes in form and details may be made therein without departing from the spirit and scope of the present disclosure as defined by the appended claims. The disclosed embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A holographic display apparatus comprising: a focus-forming optical element configured to form a plurality of foci by receiving plane waves;
   a collimating lens configured to propagate, as plane waves, light incident through the plurality of foci;
   a spatial light modulator configured to generate a holographic image by overlapping a plurality of plane waves incident from the collimating lens; and
   an aberration corrector configured to measure aberration by using an image captured by making the holographic image and a reference wave interfere with each other, and reflect a complex wavefront corresponding to inverse of the measured aberration, in the spatial light modulator.

2. The holographic display apparatus of claim 1, wherein the focus-forming optical element is implemented using one of a lens array, holographic optical elements, diffraction optical elements, and a pinhole array.

3. The holographic display apparatus of claim 1, wherein the collimating lens is implemented using a Fourier lens.

4. A holographic display apparatus comprising: a focus-forming optical element configured to form a plurality of foci by receiving plane waves;
   a collimating lens configured to propagate, as plane waves, light incident through the plurality of foci;
   a spatial light modulator configured to generate a holographic image by overlapping a plurality of plane waves incident from the collimating lens; and
   an optimizer configured to generate a predictive hologram obtained by back-propagating the holographic image, generate a predictive holographic image for the predictive hologram through a model simulating an optical system of a holographic display, and repeat a process of generating the predictive hologram and the predictive holographic image until a value of a loss function between the predictive holographic image and a predefined target image is less than a predefined threshold, by using a gradient descent method.

5. An optimization method of a holographic display, the optimization method comprising:
   forming a plurality of foci with respect to plane waves by using a focus-forming optical element;
   propagating, as plane waves, light incident through a collimating lens through the plurality of foci;
   by a spatial light modulator, generating a holographic image by overlapping a plurality of plane waves incident from the collimating lens; and
   measuring aberration by using an image captured by making the holographic image and a reference wave interfere with each other, and reflecting a complex wavefront corresponding to inverse of the measured aberration, in the spatial light modulator.

6. An optimization method of a holographic display, the optimization method comprising:
   forming a plurality of foci with respect to plane waves by using a focus-forming optical element;
   propagating, as plane waves, light incident through a collimating lens through the plurality of foci;

by a spatial light modulator, generating a holographic image by overlapping a plurality of plane waves incident from the collimating lens; and generating a predictive hologram obtained by back-propagating the holographic image;

generating a predictive holographic image about the predictive hologram through a model simulating an optical system of the holographic display;

calculating a loss function between the predictive holographic image and a predefined target image; and repeating from the generating of the predictive hologram to the calculating of the loss function until a value of the loss function is less than a predefined threshold, by using a gradient descent method.

* * * * *